United States Patent [19]

Mueller et al.

[11] 4,390,216
[45] Jun. 28, 1983

[54] CARRIAGE HAVING INTEGRAL SPRING

[75] Inventors: Fredrick N. Mueller; Henry C. Brown, both of Dallas, Tex.

[73] Assignee: Camsco, Inc., Richardson, Tex.

[21] Appl. No.: 302,799

[22] Filed: Sep. 16, 1981

[51] Int. Cl.³ .............................................. F16C 29/00
[52] U.S. Cl. ..................................................... 308/6 R
[58] Field of Search ................ 308/3 R, 3 A, 3.5, 3.8, 308/3 B, 6 R; 33/438, 1 M; 312/330, 342, 343, 344

[56] References Cited

U.S. PATENT DOCUMENTS

| | | | |
|---|---|---|---|
| 1,926,828 | 9/1933 | Van Berkel | 308/3 A |
| 3,673,691 | 7/1972 | Gilbert | 33/76 |
| 4,149,319 | 4/1979 | Nelle | 308/6 R X |

FOREIGN PATENT DOCUMENTS 464431 8/1928 Fed. Rep. of Germany .......... 308/6

*Primary Examiner*—Stuart S. Levy
*Assistant Examiner*—David Werner
*Attorney, Agent, or Firm*—Richards, Harris & Medlock

[57] ABSTRACT

A carriage (30) for slidable movement along a track (100) having first and second parallel spaced apart guide surfaces (102, 104) is provided. The carriage (30) includes a base member (36). Structure (72, 78, 80) is mounted on the base member (36) for contacting the first and second parallel spaced apart guide surfaces (102, 104) on the track (100). The base member (36) includes a spring (50, 56, 58), such that as the base member (36) moves along the track (100), the base member (36) is resiliently compressed to thereby urge the structure (72, 78, 80) against the guide surfaces (102, 104) on the track (100).

5 Claims, 4 Drawing Figures

CARRIAGE HAVING INTEGRAL SPRING

TECHNICAL FIELD

This invention relates to instrument carriages, and more particularly to an instrument carriage having an integral spring.

BACKGROUND ART

Automatically controlled instrument systems having carriages which move in two coordinate directions over a work surface of a table are well known. Typically, a first carriage traverses the table in one coordinate direction parallel to the work surface and a second carriage mounted on the first carriage moves relative to the first carriage in the other coordinate direction. When an instrument is mounted on the second carriage, composite movements of both carriages allow the instrument to be translated to any point over the region of the work surface traversed by the carriages. Accurate positioning of the carriages and, consequently, of the instrument, is achieved by numerical control which may operate either from an on-line data generator or from previously programmed data. Such a numerical control system is described in U.S. Pat. No. 3,887,903. Additionally, such instrument systems can be operated manually to position an instrument to predetermined locations.

Automatically as well as manually controlled systems of this type may be employed with a wide variety of instruments. These instruments may include, for example, plotting pens or styli for drawing graphical representations of information on paper. Additionally, these instruments may include cutting or drilling tools including, routers and water jet cutters for cutting a variety of sheet material, such as fabric and plastics.

In such systems, it is desirable to accurately position the carriage in both coordinate directions. Particularly, where a second carriage is mounted on a beam driven by the first carriage and moves relative to the first carriage, it is desirable that the second carriage slidably moves on the beam with minimal displacement in directions other than the coordinate direction of movement. The second carriage must engage the beam for free, slidable movement thereon over the entire length of the beam independent of dimensional variations present in the beam track. Due to variation in the components which mount the carriage to the beam or track, the instrument being carried by the second carriage may not perform consistently, as desired, over all areas of the work surface of a table. For example, where there are variations in the width of the track upon which the carriage rides, in narrow places, the instrument will be slowed as it moves over the surface of the table to thereby create an inaccurate plot or cut. Additionally, where the track is wider than specified, the instrument is not maintained in the desired perpendicular position to the work surface, also resulting in an inaccurate plot or cut. Therefore, it is desirable that the carriage for mounting an instrument to a track have the capability of compensating for any dimensional variations in the track.

Previously developed carriages have utilized complicated spring mechanisms interconnected to wheels to compensate for variations in the width of a track. Such systems have required numerous parts requiring frequent replacement due to damage and wear. Furthermore, such carriages have not sufficiently compensated for variations in the width of a track resulting in inaccurate operation of the instrument.

A need has thus arisen for a carriage for carrying an instrument which maintains the instrument in a predetermined position relative to the carriage regardless of variations in the track upon which the carriage rides.

DISCLOSURE OF THE INVENTION

In accordance with the present invention, a carriage for use in an instrument system is provided which substantially eliminates the problems heretofore associated with instrument carriages, including lack of compensation for dimensional variations in the track upon which the carriage rides.

In accordance with the present invention, a carriage for slidable movement along a track having first and second parallel spaced guide surfaces is provided. The carriage includes a base member. Structure is mounted on the base member for contacting the first and second parallel spaced guide surfaces on the track. The base member includes a spring, such that as the base member moves along the track, the base member is resiliently compressed to thereby urge the contact structure against the guide surfaces on the track.

In accordance with another aspect of the present invention, a carriage for slidable movement along a track having first and second parallel spaced guide surfaces is provided. The carriage includes a base member having an aperture to define first and second portions. First guide structure is mounted to the first portion for contacting the first guide surface. Second and third guide structures are mounted to the second portion of the base member for contacting the second guide surface. The guide structures contact the guide surfaces, such that the first portion of the base member is compressed relative to the second portion to thereby urge the guide structures against the guide surfaces.

In accordance with another aspect of the present invention, a carriage for slidable movement along a track having first and second parallel spaced guide surfaces is provided. The carriage includes a base member having first and second edges parallel to the first and second guide surfaces. First and second beam members each having first and second ends extend from and are interconnected to the base member at the beam member first ends. A mounting plate is interconnected to the second ends of the first and second beam members. A first roller is mounted to the mounting plate for slidably engaging the first guide surface. Second and third rollers are mounted to the base member along the second edge thereof for slidably engaging the second guide surface. Structure interconnects the mounting plate to the base member. The first and second beam members are deflected in a direction perpendicular to the second edge of the base member to thereby urge the rollers against the guide surfaces of the track.

BRIEF DESCRIPTION OF THE DRAWINGS

For a more complete understanding of the present invention and for further advantages thereof, reference is now made to the following Detailed Description, taken in conjunction with the accompanying Drawings in which.

DETAILED DESCRIPTION

Figure 1:
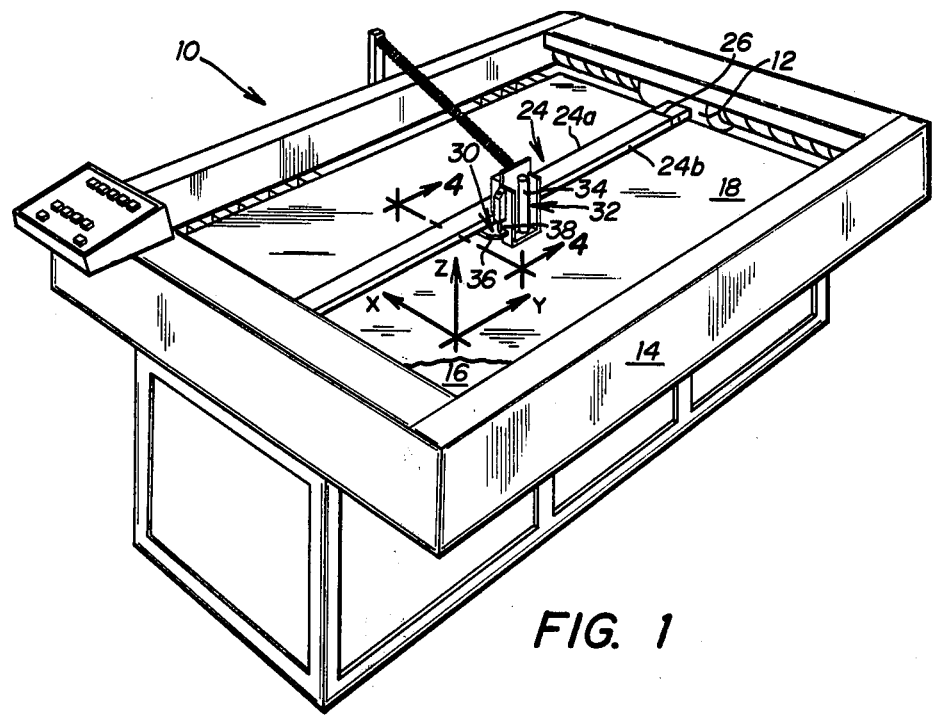
FIG. 1 is a perspective view of an automatically controlled instrument system utilizing the carriage of the present invention.

Referring to FIG. 1, a perspective view of an automatically controlled instrument system for use with the instrument carriage of the present invention is illustrated and is generally identified by the numeral 10. Automatically controlled instrument system 10 may be used as a plotter for plotting a graphical representation of informational data on paper. Additionally, instrument system 10 may be utilized to cut sheet material which as used herein includes, for example, cloth, fabric, plastic, foil, wood or other material which is held in fixed position so that a predetermined line of cut can be accurately traversed through the sheet material by a cutting tool during the cutting operation. The sheet material may be a single ply or multi-ply in a layup.

Although a plotting system has been selected for illustration of a use of the present instrument carriage, the invention can be employed in any type of automatically, as well as manually, controlled system having an instrument supported in a carriage for precise positioning over sheet material that is held stationary relative to the carriage during operation of the instrument. As used herein, an instrument will include either a cutting device or a plotting device and includes such instruments as, for example, plotting pens or styli, ink jet printers, knives, routers, water jet and flame cutters, laser cutters and various other instruments.

Automatically controlled instrument system 10 includes a longitudinal carriage 12 which is mounted adjacent a table 14. Table 14 includes a work surface 16 for supporting sheet material 18. Carriage 12 is mounted to and indexes on table 14 for slidable movement along the longitudinal or "X" coordinate direction to traverse table 14.

Carriage 12 supports a beam generally identified by the numeral 24 having parallel side walls 24a and 24b. Beam 24 is attached to carriage 12 through a bracket 26.

Mounted to beam 24 for slidable movement therein is an instrument carriage generally identified by the numeral 30 which is the subject of the present invention. Instrument carriage 30 supports an instrument generally identified by the numeral 32 including a pen 34. Instrument 32 moves in a direction traverse to the movement of carriage 12 to cross table 14 in a direction perpendicular to the movement of carriage 12 or in a "Y" coordinate direction relative to table 14. Instrument carriage 30 includes a base plate 36 and rods 38 for supporting instrument 32.

Figure 2:
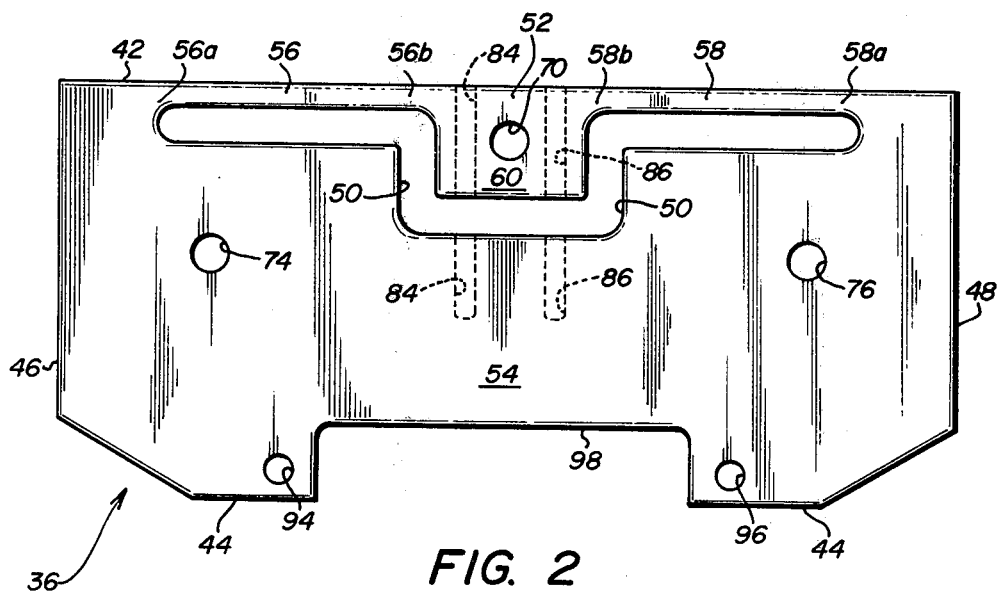
FIG. 2 is a plan view of the base plate of the carriage of the present invention.

Referring now to FIG. 2, base plate 36 of the present invention is illustrated. Base plate 36 is defined by side edges 42 and 44 and end edges 46 and 48. Disposed within base plate 36 and adjacent side edge 42 is an elongated slotted aperture 50. Aperture 50 is positioned substantially parallel to side edge 42 of base plate 36 and defines portions 52 and 54 of base plate 36. Base plate 36 is manufactured from a material having a high hardness characteristic and may comprise, for example, aluminum.

Portion 52 of base plate 36 includes beams or arms 56 and 58, each having ends "a" and "b." Ends 56a and 58a of arms 56 and 58 are interconnected to portion 54 of base plate 36. Ends 56b and 58b of arms 56 and 58 are interconnected to a mounting plate 60 centrally disposed on base plate 36.

Due to the configuration of arms 56 and 58 disposed adjacent aperture 50, pressure applied to mounting plate 60 will cause arms 56 and 58 to deflect in a direction toward side edge 44 of base plate 36 such that portion 52 of base plate 36 acts as an integral spring to thereby resiliently compress base plate 36.

Figure 3:
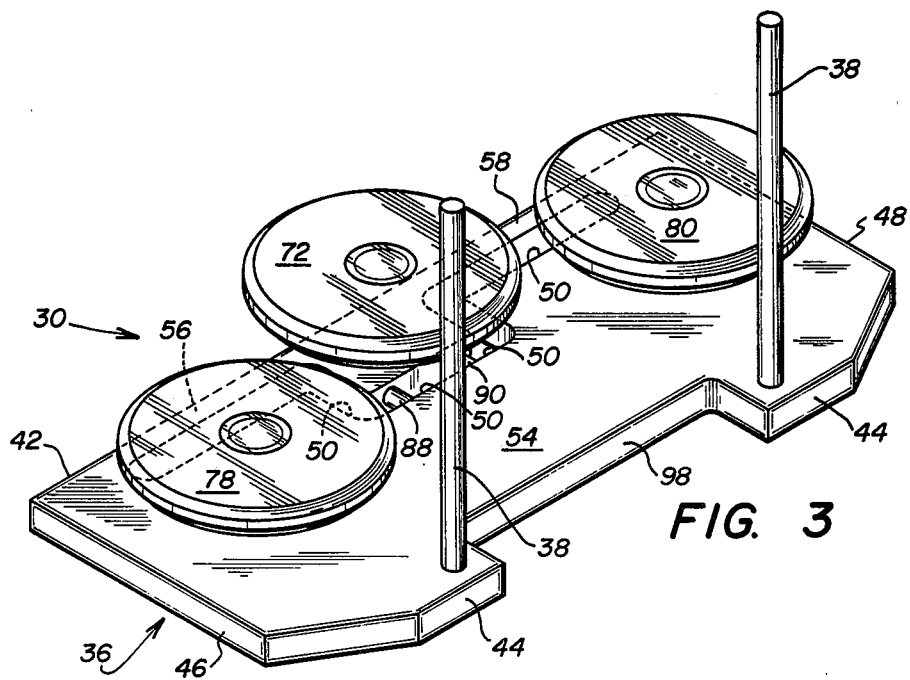
FIG. 3 is a perspective view of the carriage of the present invention.

Referring simultaneously to FIGS. 2 and 3 wherein like numerals are utilized for like and corresponding components previously identified, disposed within mounting plate 60 is an aperture 70 for mounting a wheel 72 adjacent side edge 42 of base plate 36. Disposed within portion 54 of base plate 36 are apertures 74 and 76 for mounting wheels 78 and 80 to base plate 36. Wheels 78 and 80 are disposed along a common axis parallel to side edge 44 of base plate 36. Wheels 72, 78 and 80 are manufactured from a thermoplastic material such as, for example, acetal resins sold under the trademark Delrin.

Disposed through mounting plate 60 and extending into portion 54 of base plate 36 are apertures 84 and 86. Apertures 84 and 86 are disposed perpendicularly to aperture 70 and receive rods 88 and 90, respectively. Rods 88 and 90 frictionally engage portion 54 of base plate 36 to allow mounting plate 60 to freely slide on rods 88 and 90 in a direction perpendicular to side edge 44 of base plate 36. Rods 88 and 90 traverse aperture 50, thereby interconnecting mounting plate 60 to portion 54 of base plate 36 to prevent rotational or twisting motion of portion 52 of base plate 36 relative to portion 54. Through the use of rods 88 and 90, wheel 72 is maintained in a plane parallel to base plate 36 and which also contains wheels 78 and 80.

Disposed adjacent side edge 44 of base plate 36 are apertures 94 and 96 for receiving rods 38 which support instrument 32. Instrument 32 is received in a cutout 98 disposed within side edge 44 of base plate 36.

Figure 4:
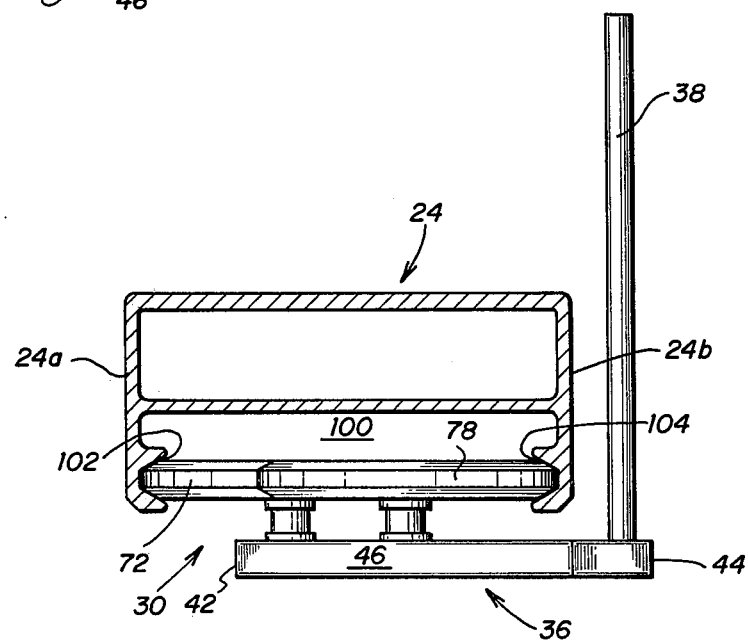
FIG. 4 is a sectional view taken generally along sectional lines 4—4 of FIG. 1 illustrating the carriage of the present invention mounted to a track.

Referring to FIG. 4, wherein like numerals are utilized for like and corresponding components, instrument carriage 30 is illustrated mounted within beam 24. Beam 24 includes a track 100 defined by guide surfaces 102 and 104, parallel to side walls 24a and 24b of beam 24. Wheel 72 is disposed adjacent guide surface 102 while wheels 78 and 80 are disposed adjacent guide surface 104 within track 100. Due to the interaction of portions 52 and 54 of base plate 36, an interference fit occurs between wheels 72, 78 and 80 with guide surfaces 102 and 104 such that instrument carriage 30 positively engages beam 24 for movement therein. Variations in the width of track 100 over the length of beam 24 are compensated due to the compression of arms 56 and 58 towards side edge 44 of base plate 36 such that arms 56 and 58 act as a spring. Instrument carriage 30 therefore can freely move within beam 24 regardless of reasonable variations in the width of track 100. Furthermore, the use of rods 88 and 90 (FIG. 3) prevent any twisting motion of instrument carriage 30 as it moves along beam 24.

It therefore can be seen that the present instrument carriage maintains an instrument in a predetermined position for movement along a beam above a work surface of a table and sheet material regardless of variations in the beam upon which the instrument carriage is mounted and moves. The instrument carriage of the present invention maintains a force between the carriage and mounting beam and is constructed using a minimum number of components for improved reliability and maintenance-free operation.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A carriage for slidable movement along a track having first and second parallel spaced-apart guide surfaces comprising:
    a base member having first and second edges parallel to said first and second parallel spaced apart guide surfaces, said base member having an elongated slotted aperture formed therein along said first edge thereof, said aperture defining first and second portions of said base member spaced apart thereby, said first portion supported at its ends by said second portion;
    first roller means mounted on said first portion of said base member for slidably engaging said first guide surface; and
    second roller means mounted on said second portion of said base member for slidably engaging said second guide surface, wherein said base member forms an integral spring for compressing said first portion of said base member relative to said second portion to thereby bias said first and second roller means against said guide surfaces to maintain the carriage in said track, and for compensating for dimensional variations in said track.

2. The carriage of claim 1 wherein said first portion of said base member comprises first and second beam members, each having first and second ends, said first and second beam members extending from and interconnected to said second portion of said base member at said beam member first ends, and a mounting plate interconnected to said second ends of said first and second beam members and being supported thereby.

3. The carriage of claim 2 wherein said first roller means is mounted on said mounting plate.

4. The carriage of claim 1 and further including:
    means traversing said aperture for interconnecting said first and second portions to thereby prevent rotational movement of said first portion relative to said second portion.

5. The carriage of claim 1 wherein said first roller means includes first wheel means and said second roller means includes second and third wheel means such that said first wheel means is disposed medial of said second and third wheel means.

* * * * *